(12) United States Patent
Miyoshi et al.

(10) Patent No.: US 10,030,290 B2
(45) Date of Patent: Jul. 24, 2018

(54) STEEL SHEET FOR HOT PRESS-FORMING, HOT PRESS-FORMED PART, AND METHOD OF PRODUCING HOT PRESS-FORMED PART

(71) Applicant: JFE Steel Corporation, Tokyo (JP)

(72) Inventors: Tatsuya Miyoshi, Fukuyama (JP); Seiji Nakajima, Chiba (JP); Satoru Ando, Chiba (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 14/438,993

(22) PCT Filed: Oct. 28, 2013

(86) PCT No.: PCT/JP2013/006347
§ 371 (c)(1),
(2) Date: Apr. 28, 2015

(87) PCT Pub. No.: WO2014/068939
PCT Pub. Date: May 8, 2014

(65) Prior Publication Data
US 2015/0337415 A1 Nov. 26, 2015

(30) Foreign Application Priority Data

Oct. 31, 2012 (JP) ................................. 2012-239973

(51) Int. Cl.

| | |
|---|---|
| *C22C 38/06* | (2006.01) |
| *C22C 38/38* | (2006.01) |
| *C22C 38/34* | (2006.01) |
| *B21D 37/16* | (2006.01) |
| *C22C 18/00* | (2006.01) |
| *C22C 19/03* | (2006.01) |
| *C22C 38/00* | (2006.01) |
| *C22C 38/60* | (2006.01) |
| *C23C 28/00* | (2006.01) |
| *C22C 18/04* | (2006.01) |
| *C25D 3/56* | (2006.01) |
| *C25D 5/14* | (2006.01) |
| *C25D 5/48* | (2006.01) |
| *B32B 15/01* | (2006.01) |
| *C22C 38/02* | (2006.01) |
| *C22C 38/04* | (2006.01) |
| *C22C 38/28* | (2006.01) |
| *C22C 38/32* | (2006.01) |
| *C23C 2/06* | (2006.01) |
| *C23C 2/26* | (2006.01) |
| *C23C 2/40* | (2006.01) |
| *C21D 1/673* | (2006.01) |
| *C25D 5/50* | (2006.01) |
| *C25D 5/10* | (2006.01) |

(Continued)

(52) U.S. Cl.
CPC .............. *C22C 38/06* (2013.01); *B21D 37/16* (2013.01); *B32B 15/013* (2013.01); *C21D 1/673* (2013.01); *C22C 18/00* (2013.01); *C22C 18/04* (2013.01); *C22C 19/03* (2013.01); *C22C 38/00* (2013.01); *C22C 38/001* (2013.01); *C22C 38/02* (2013.01); *C22C 38/04* (2013.01); *C22C 38/28* (2013.01); *C22C 38/32* (2013.01); *C22C 38/34* (2013.01); *C22C 38/38* (2013.01); *C22C 38/60* (2013.01); *C23C 2/06* (2013.01); *C23C 2/26* (2013.01); *C23C 2/40* (2013.01); *C23C 28/00* (2013.01); *C25D 3/562* (2013.01); *C25D 3/565* (2013.01); *C25D 5/10* (2013.01); *C25D 5/14* (2013.01); *C25D 5/48* (2013.01); *C25D 5/50* (2013.01); *C25D 7/0614* (2013.01); *C21D 1/18* (2013.01); *C21D 9/00* (2013.01); *Y10T 428/12569* (2015.01)

(58) Field of Classification Search
CPC ......... C22C 38/06; C22C 38/38; C22C 38/34; C22C 18/00; C22C 19/03; C22C 38/00; C22C 38/60; C22C 28/00; C22C 18/04; C22C 38/001; C22C 38/02; C22C 38/04; C22C 38/28; C22C 38/32; B21D 37/16; C25D 3/562; C25D 5/14; C25D 5/48; C25D 3/565; C25D 5/50; C25D 2/10; C25D 7/0614; B32B 15/013; C23C 2/06; C23C 2/26; C23C 2/40; C21D 1/673; C21D 9/00; C21D 1/18; Y10T 428/12569
See application file for complete search history.

(56) References Cited

U.S. PATENT DOCUMENTS 6,652,728 B1 11/2003 Sonntag et al.
9,040,166 B2 5/2015 Nakamaru et al.
(Continued)

FOREIGN PATENT DOCUMENTS

DE 3151115 9/1982
EP 2 371 984 10/2011
(Continued)

OTHER PUBLICATIONS

Supplemental European Search Report dated Oct. 6, 2015 of corresponding European Application No. 13850861.9.
Korean Office Action dated Jan. 21, 2016 of corresponding Korean Application No. 2015-7008668 along with a Concise Statement of Relevance of Office Action in English.
Chinese Office Action dated Feb. 3, 2016 of corresponding Chinese Application No. 201380056511.9, along with an English translation of the Search Report.
Chinese Office Acion dated Oct. 31, 2016, of corresponding Chinese Application No. 201380056511.9, along with a Concise Statement of Relevance of Office Action in English.
(Continued)

*Primary Examiner* — Jonathan C Langman
(74) *Attorney, Agent, or Firm* — DLA Piper LLP (US)

(57) ABSTRACT

A steel sheet for hot press-forming includes a zinc coating layer and a Si-containing compound layer in this order on a base steel sheet, wherein the Si-containing compound layer contains a silicone resin having an organic functional group of a carbon number of 4 or more.

15 Claims, No Drawings

(51) Int. Cl.
*C25D 7/06* (2006.01)
*C21D 9/00* (2006.01)
*C21D 1/18* (2006.01)

(56) References Cited

U.S. PATENT DOCUMENTS

| | | |
|---|---|---|
| 2001/0042393 A1 | 11/2001 | Kefferstein et al. |
| 2013/0122322 A1 | 5/2013 | Nakajima et al. |

FOREIGN PATENT DOCUMENTS

| | | |
|---|---|---|
| GB | 1 490 535 | 11/1977 |
| JP | 3663145 | 6/2005 |
| JP | 2007-063578 | 3/2007 |
| JP | 2007-246775 | 9/2007 |
| JP | 2008-000688 | 1/2008 |
| JP | 4039548 | 1/2008 |
| JP | 4883240 | 2/2012 |
| JP | Wo-2012-018014 * 2/2012 | ............... C25D 5/26 |
| WO | 2011/070859 | 6/2011 |

OTHER PUBLICATIONS

Communication dated May 16, 2017, of corresponding European Application No. 13 850 861.9.
Official Action dated Nov. 7, 2017, of related U.S. Appl. No. 14/094,003.
Official Action dated Sep. 22, 2017, of related U.S. Appl. No. 14/680,302.
European Official Action dated Feb. 27, 2018, from corresponding European Application No. 13850861.9.
Office Action dated May 24, 2018, of related U.S. Appl. No. 14/094,003.

* cited by examiner

STEEL SHEET FOR HOT PRESS-FORMING, HOT PRESS-FORMED PART, AND METHOD OF PRODUCING HOT PRESS-FORMED PART

TECHNICAL FIELD

This disclosure relates to a steel sheet for hot press-forming which is suited for automobile parts such as chassis and body structures by hot press-forming technique, a hot press-formed part produced using the steel sheet for hot press-forming, and a method of producing the hot press-formed part using the steel sheet for hot press-forming.

BACKGROUND

Many automobile parts such as chassis and body structures are conventionally produced by press-forming steel sheets having a prescribed strength at room temperature. In recent years, weight reduction of automobile bodies has been desired from the viewpoint of the preservation of the global environment. Thus, there have been continuous efforts to decrease the thickness of steel sheets used for automobile parts by increasing the strength of such steel sheets. However, increasing the strength of a steel sheet is accompanied by a decrease in press-formability of the steel sheet and it is frequently difficult to press-form such a steel sheet into automobile parts with desired shapes.

To remedy this difficulty, United Kingdom Patent Publication No. 1490535 proposes a technique in which a steel sheet that has been heated is press-formed with a mold composed of a die and a punch while being simultaneously rapidly cooled. That technique, called "hot" press-forming, realizes good press-formability of a high strength steel sheet.

However, that hot press-forming involves heating of a steel sheet to a high temperature of about 950° C. before press-forming. As a result, scales (iron oxides) are formed on the surface of the steel sheet. Such scales are peeled off during the hot press-forming and damage the mold or damage the surface of the hot press-formed parts. Further, scales remaining on the surface of the parts deteriorate the appearance or decrease paint adhesiveness. Thus, the surface of such parts is usually descaled by treatments such as pickling or shot blasting. However, implementation of these treatments makes the producing steps complicated and decreases productivity.

Such automobile parts as chassis and body structures require excellent corrosion resistance, but the hot press-formed parts produced through the above treatments exhibit significantly insufficient corrosion resistance due to the fact that they are not provided with an anticorrosion film such as a coating layer.

Thus, there has been a demand for a hot press-forming technique which can suppress formation of scales during heating before hot press-forming and also can increase corrosion resistance of hot press-formed parts. This has led to proposals of steel sheets having a film such as a coating layer on the surface, and hot press-forming methods using such steel sheets. For example, Japanese Patent No. 3663145 discloses a method of producing a hot press-formed part excellent in corrosion resistance in which a steel sheet coated with Zn or Zn-based alloy is hot press-formed so that Zn—Fe-based compound or Zn—Fe—Al-based compound is formed on the surface of the part. Japanese Patent No. 4039548 discloses a hot press-formed article (part) excellent in formability, weldability, and corrosion resistance obtained by heating a galvannealed steel sheet at 700° C. to 1000° C. for 2 to 20 minutes and hot press-forming the steel sheet to form a coating layer containing Fe—Zn solid solution phase on the surface of the article. Japanese Patent No. 4883240 discloses a steel sheet for hot press-forming excellent in paint adhesiveness and perforation corrosion resistance after heating which is manufactured by forming a Zn—Ni coating layer on the surface of a coating layer I mainly containing Ni, and further by forming a compound layer containing, for example, Si, Ti, Al, and Zr thereon.

However, the hot press-formed part described in Japanese Patent No. 3663145 and Japanese Patent No. 4039548 often exhibits low resistance against perforation corrosion (hereinafter, called perforation corrosion resistance) which tends to occur at portions where chemical conversion films or electrodeposited films are not fully formed.

Although a hot press-formed part excellent in perforation corrosion resistance can be obtained using the steel sheet for hot press-forming described in Japanese Patent No. 4883240, a hot-pressed part can be further preferably applied in a part which is subjected to severe corrosive environment, if the perforation corrosion resistance of the hot press-formed part can be further improved, and if sufficient joint corrosion resistance can be additionally achieved.

It could therefore be helpful to provide a steel sheet for hot press-forming which is necessary to produce a hot press-formed part excellent in perforation corrosion resistance and joint corrosion resistance in a severe environment, a hot press-formed part produced using the steel sheet for hot press-forming, and a method of producing a hot press-formed part using the steel sheet for hot press-forming.

SUMMARY

We found that:
(i) The hot press-formed part produced using a steel sheet provided with a coating layer composed of Zn or a Zn-based alloy described in Japanese Patent No. 3663145 or Japanese Patent No. 4039548 is poor in perforation corrosion resistance because there is a significant decrease in sacrificial anticorrosive effect which Zn primarily has due to Zn in the coating layer being diffused into a base steel sheet and taken into an Fe—Zn solid solution phase or due to a large amount of Zn oxides being formed on the surface of the coating layer when heating is performed before hot press-forming.
(ii) By forming a Si-containing compound layer mainly containing a special silicone resin on the zinc coating layer, since Zn in the zinc coating layer and the Si-containing compound form a complex compound ($Zn_2SiO_4$) when heating is performed before hot press-forming, it is possible to achieve excellent perforation corrosion resistance and joint corrosion resistance.

We thus provide a steel sheet for hot press-forming having a zinc coating layer and a Si-containing compound layer in this order on a base steel sheet, in which the Si-containing compound layer contains a silicone resin having an organic functional group of a carbon number of 4 or more.

It is preferable that the Si-containing compound layer further contains a silane coupling agent, in which the compounding ratio of the silicone resin and the silane coupling agent is 5/5 or more in terms of mass ratio (silicone resin/silane coupling agent).

It is preferable that the zinc coating layer consists of a coating layer I and a coating layer II in this order on the base steel sheet, in which the coating layer I contains 60 mass % or more of Ni and the balance being Zn and inevitable impurities and has a coating weight of 0.01 g/m² or more and 5 g/m² or less, and the coating layer II contains 10 mass % or more and 25 mass % or less of Ni and the balance being Zn and inevitable impurities and has a coating weight of 10 g/m² or more and 90 g/m² or less.

It is preferable that the base steel sheet has a chemical composition consisting of, by mass %, C: 0.15% or more and 0.5% or less, Si: 0.05% or more and 2.0% or less, Mn: 0.5% or more and 3% or less, P: 0.1% or less, S: 0.05% or less, Al: 0.10% or less, N: 0.010% or less, and the balance being Fe and inevitable impurities.

It is preferable that the chemical composition described above further contains, by mass %, at least one selected from Cr: 0.01% or more and 1% or less, Ti: 0.20% or less, and B: 0.0005% or more and 0.08% or less.

It is preferable that the chemical composition described above further contains, by mass %, Sb: 0.003% or more and 0.03% or less.

We also provide a hot press-formed part produced by heating the steel sheet for hot press-forming, and hot press-forming the heated steel sheet, in which a diffraction peak of $Zn_2SiO_4$ in the vicinity of $2\theta=36.1$ degrees having a peak intensity of 0.20 kcps or more is observed when an X-ray diffraction intensity measurement is performed on the surface of the hot press-formed part.

We also provide a method of producing a hot press-formed part including heating the steel sheet for hot press-forming described above to a temperature in the range of $Ac_3$ transformation point to 1000° C., and hot press-forming the heated steel sheet.

In the method of producing a hot press-formed part, it is preferable that the steel sheet be heated at an average heating rate of 100° C./s or more to a temperature of in the range of $Ac_3$ transformation point to 1000° C.

Using the steel sheet for hot press-forming, it is possible to obtain a hot press-formed part excellent in perforation corrosion resistance and joint corrosion resistance in a severe environment. A hot press-formed part produced using the steel sheet for hot press-forming and using the method of producing a hot press-formed part can be preferably used for automobile parts such as chassis and body structures.

DETAILED DESCRIPTION

Examples of our steel sheets, parts, and methods will be described hereafter. However, this disclosure is not limited to the examples described below.
1) Steel Sheet for Hot Press-Forming The steel sheet for hot press-forming has a zinc coating layer which is formed on the surface of a base steel sheet and a Si-containing compound layer which is formed on the zinc coating layer. Methods of forming the Si-containing compound layer and the zinc coated layer, and methods of manufacturing the base steel sheet and the steel sheet for hot press-forming will be described hereafter.

1-1) Si-Containing Compound Layer

The Si-containing compound layer contains a silicone resin having an organic functional group of a carbon number of 4 or more. The silicone resin is a resin having a siloxane unit in a resin skeleton. The silicone resin also includes not only a resin having a siloxane unit alone but also a resin having a siloxane unit and a unit other than a siloxane (such as an organic compound unit containing, for example, C, H, N, O).

Examples of the organic functional group described above include a phenyl group, a glycidoxypropyl group, a styryl group, a methacryloxypropyl group, an acryloxypropyl group, an aminoethyl-aminopropyl group, and an ureidopropyl group. Also, the organic functional group of a carbon number of 4 or more which is modified by, for example, epoxy modification, alkyd modification, polyester modification, or acryl modification may be used.

Such a silicone resin combines with Zn in a zinc coating layer described below to form $Zn_2SiO_4$ at hot press-forming. On the other hand, when a silicone resin having an organic functional group of a carbon number of 3 or less, silane coupling agent, or an inorganic Si-containing compound (such as lithium silicate, sodium silicate, or colloidal silica) is used, $Zn_2SiO_4$ is scarcely formed. Therefore, when a silicone resin having an organic functional group of a carbon number of 3 or less is used, improvement of perforation corrosion resistance and joint corrosion resistance in a severe corrosive environment can scarcely be realized. In addition, when, for example, a Ti-containing compound, an Al-containing compound, or a Zr-containing compound is used instead of a Si-containing compound, no complex compound is formed, or, even if a complex compound is formed, the complex compound has no effect of improving perforation corrosion resistance and joint corrosion resistance which a Si-containing complex compound has.

It can be confirmed whether or not $Zn_2SiO_4$ is formed at hot press-forming, by heating the steel sheet for hot press-forming, hot press-forming the heated steel sheet, and measuring an X-ray diffraction intensity on the surface of the hot press-formed part using an X-ray diffraction method. The heating in this case is substantially the same as the heating which the steel sheet for hot press-forming receives at actual hot press-forming. Specifically, regarding the heating described above, it is preferable that the heating be performed such that a maximum steel sheet temperature is in a range of $Ac_3$ transformation point to 1000° C. and that a holding time at the maximum steel sheet temperature be 300 seconds or less.

It can be confirmed that $Zn_2SiO_4$ is formed in a steel sheet for hot press-forming at hot press-forming, by heating the steel sheet for hot press-forming, hot press-forming the heated steel sheet, measuring the X-ray diffraction intensity on the surface of the hot press-formed part using an X-ray diffraction method, and observing a diffraction peak of $Zn_2SiO_4$ in the vicinity of $2\theta=36.1$ degrees having a peak intensity of 0.20 kcps or more. The measurement of X-ray diffraction intensity is performed using Cu—Kα ray under the condition that Kβ ray is removed using a graphite single-crystal monochrometer.

When the diffraction peak of $Zn_2SiO_4$ is observed in the vicinity of $2\theta=36.1$ degrees and when the peak intensity is 0.20 kcps or more, preferably 0.30 kcps or more, there is a significant effect of improving perforation corrosion resistance. On the other hand, when the peak intensity is less than 0.20 kcps, there is substantially no effect of improving perforation corrosion resistance and joint corrosion resistance.

When "heating a steel sheet for hot press-forming" is under the condition that the peak intensity described above is 0.20 kcps or more is not satisfied even if the heating has been performed under one heating condition selected from ranges in which the maximum steel sheet temperature is $Ac_3$ transformation point to 1000° C. and in which the holding time at the maximum steel sheet temperature is 300 seconds or less, if the condition for the peak intensity described above is satisfied under another heating condition selected from the ranges for the maximum steel sheet temperature and the holding time described above, the steel sheet for hot press-forming is regarded as our steel sheet for hot press-forming.

As described above, when the steel sheet for hot press-forming is heated, $Zn_2SiO_4$ is formed in a Si-containing compound layer. The steel sheet for hot press-forming which has been heated once and in which $Zn_2SiO_4$ is formed in a Si-containing compound layer and the steel sheet for hot press-forming which has not been heated yet and in which $Zn_2SiO_4$ is not formed in a Si-containing compound layer are both regarded as our steel sheet for hot press-forming.

There is no particular limitation on the thickness of a Si-containing compound layer, and the thickness may be appropriately controlled. It is preferable that the thickness of a Si-containing compound layer be 0.1 μm or more from a view point of increasing of the paint adhesiveness. In addition, it is more preferable that the thickness of a Si-containing compound layer be 3.0 μm or less because there is no case where there is a decrease in paint adhesiveness due to the Si-containing compound layer becoming brittle. It is further more preferable that the thickness be 0.4 μm or more and 2.0 μm or less.

There is no particular limitation on the content of a silicone resin which is contained in a Si-containing compound layer. It is preferable that the content of a silicone resin be 50 mass % or more and 100 mass % or less from a view point of sufficient improvement of perforation corrosion resistance and joint corrosion resistance. It is more preferable that the content be 80 mass % or more and 100 mass % or less.

A Si-containing compound layer may contain components other than a silicone resin described above as long as the effect is not injured. For example, it is preferable that a Si-containing compound layer contains a silane coupling agent. When a silane coupling agent is contained in the Si-containing compound layer, since $Zn_2SiO_4$ is likely to be formed compared to when a Si-containing compound other than a silane coupling agent (such as lithium silicate), a Ti-containing compound, or a Zr-containing compound is contained in the Si-containing compound layer, the improvement of perforation corrosion resistance can be realized.

When a Si-containing compound layer contains a silane coupling agent, it is preferable that the compound ratio with respect to the content of a silicone resin, that is, a mass ratio (silicone resin/silane coupling agent) be 5/5 or more. When the mass ratio described above is 5/5 or more, since there is a sufficient amount of $Zn_2SiO_4$ formed after heating, for example, after hot press-forming, it is possible to obtain a hot press-formed part significantly excellent in perforation corrosion resistance and joint corrosion resistance even in a severe corrosive environment. In addition, it is preferable that a silane coupling agent also has an organic functional group of a carbon number of 4 or more from a view point of improvement of perforation corrosion resistance and joint corrosion resistance.

Examples of components other than a silane coupling agent include an inorganic Si-containing compound, a Ti-containing compound, an Al-containing compound, and a Zr-containing compound.

In addition, inorganic solid lubricant may be preferably added in a Si-containing compound layer. Since there is a decrease in dynamic friction coefficient when hot press-forming is performed by adding an inorganic solid lubricant, there is an increase in press-formability.

As an inorganic solid lubricant, at least one selected from a metal sulfide (such as molybdenum disulfide and tungsten disulfide), a selenium compound (such as molybdenum selenide and tungsten selenide), graphite, a fluoride (such as graphite fluoride and calcium fluoride), a nitride (such as boron nitride and silicon nitride), borax, mica, metal tin, and an alkali metal sulfate (such as sodium sulfate and calcium sulfate) may be added.

It is preferable that the content of an inorganic solid lubricant in a Si-containing compound layer be 0.1 mass % or more and 20 mass % or less. That is because a sufficient lubrication effect can be realized when the content of an inorganic solid lubricant is 0.1 mass % or more, and because there is no decrease in paint adhesiveness when the content is 20 mass % or less.

1-2) Zinc Coating Layer

The Zn described above which is contained in $Zn_2SiO_4$ is Zn which was contained in a zinc coating layer. Therefore, there is no particular limitation on what kind of zinc coating layer is used as long as the coating layer contains Zn. For example, any kind of zinc coating such as pure zinc coating, alloyed zinc coating, zinc-nickel alloy coating, or zinc-aluminum alloy coating may be used.

In addition, the zinc coating layer may be a single layer or a multiple layer. In a multiple layer, it is appropriate that the outermost layer contains Zn. It is preferable that the zinc coating layer has a coating layer I and a coating layer II in this order on a base steel sheet. The details of the coating layer I and the coating layer II will be described below.

The coating layer I contains 60 mass % or more of Ni and the balance being Zn and inevitable impurities and has a coating weight of 0.01 g/m$^2$ or more and 5 g/m$^2$ or less.

Due to the coating layer I containing 60 mass % or more of Ni and the balance being Zn and inevitable impurities, since the diffusion of Zn in the coating layer into the base steel sheet can be suppressed, excellent perforation corrosion resistance can be imparted to a hot press-formed part. Although it is preferable that the Ni content in the coating layer I be 100 mass %, when the content is less than 100 mass %, the balance is set to be Zn having a sacrificial anticorrosive effect and inevitable impurities. When the zinc coating layer is a multiple layer as described above, it is acceptable that layers other than the outermost layer do not contain Zn.

In addition, when the coating weight of the coating layer I is 0.01 g/m$^2$ or more, the effect of preventing Zn from diffusing into the base steel sheet can be sufficiently realized and, when the coating layer is 5 g/m$^2$ or less, there is substantially no disadvantage related to an excessive increase in manufacturing cost.

The coating layer II is formed on the coating layer I to impart excellent perforation corrosion resistance to a hot press-formed part by suppressing formation of a large amount of zinc oxides on the surface of the coating layer.

The coating layer II is a coating layer containing 10 mass % or more and 25 mass % or less of Ni and the balance being Zn and inevitable impurities. Due to 10 mass % or more and 25 mass % or less of Ni, the coating layer II has a crystal structure of $Ni_2Zn_{11}$, $NiZn_3$, or $Ni_5Zn_{21}$, and a γ phase having a high melting point of 881° C. is formed in the coating layer II. As a result, a zinc oxide-forming reaction on the surface of the zinc coating layer at heating can be suppressed to a minimum degree. Moreover, since a γ phase is retained in the coating layer II even after hot press-forming, the hot press-formed steel sheet exhibits excellent perforation corrosion resistance due to the sacrificial anti-corrosive effect of Zn. Formation of a γ phase with a Ni content of 10 mass % or more and 25 mass % or less is not necessarily in accordance with the Ni—Zn alloy equilibrium diagram. This is thought to be because a reaction for forming a coating layer which occurs in, for example, an electric coating process proceeds in a non-equilibrium state.

A γ phase composed of $Ni_2Zn_{11}$, $NiZn_3$, or $Ni_5Zn_{21}$ can be confirmed by an X-ray diffraction method or an electron diffraction method using a TEM (Transmission Electron Microscopy).

In addition, due to 10 mass % or more and 25 mass % or less of Ni, a γ phase is formed in the coating layer II as described above. In addition, under some electric coating conditions, a small amount of η phase may be mixed in the coating layer II. In this case, it is preferable that the η phase content be 5 mass % or less to suppress a zinc oxide-forming reaction on the surface of the zinc coating layer at heating to a minimum degree. The η phase content is defined as a mass ratio of the amount of a η phase with respect to the total amount of the coating layer II and can be determined using, for example, an anodic dissolution method.

When the coating weight per side of the coating layer II is 10 g/m$^2$ or more, the sacrificial anticorrosive effect of Zn can be sufficiently realized, and, when the coating weight per side is 90 g/m$^2$ or less, there is substantially no disadvantage related to an excessive increase in manufacturing cost.

1-3) Base Steel Sheet

There is no particular limitation on what chemical composition which a base steel sheet should have or on the content of each chemical element of the chemical composition. To obtain a hot press-formed part having a tensile strength (TS) of 980 MPa or more, for example, a hot-rolled steel sheet or a cold-rolled steel sheet having a chemical composition consisting of, by mass %, C: 0.15% or more and 0.5% or less, Si: 0.05% or more and 2.0% or less, Mn: 0.5% or more and 3% or less, P: 0.1% or less, S: 0.05% or less, Al: 0.10% or less, N: 0.010% or less, and the balance being Fe and inevitable impurities is preferably used as a base steel sheet. The reason for the limitation on the contents of these chemical elements will be described hereafter. Here, "%" used when describing the content of each chemical element represents "mass %", unless otherwise noted.

C: 0.15% or More and 0.5% or Less

C is a chemical element which increases strength of steel. It is necessary that the C content be 0.15% or more to control the tensile strength (TS) of a hot press-formed part to be 980 MPa or more. On the other hand, when the C content is 0.5% or less, the base steel sheet has blanking workability of a certain level or higher. Therefore, the C content is 0.15% or more and 0.5% or less.

Si: 0.05% or More and 2.0% or Less

Si is, like C, a chemical element which increases strength of steel. It is necessary that the Si content be 0.05% or more to control the TS of a hot press-formed part to be 980 MPa or more. On the other hand, when the Si content is 2.0% or less, surface defect called red scale hardly occurs and there is substantially no increase in rolling load at hot rolling, and the hot-rolled steel sheet has sufficient ductility. Moreover, when the Si content is 2.0% or less, a negative effect on coating properties is less likely to occur when coating treatment for forming a coating film mainly containing Zn is performed on the surface of steel sheet. Therefore, the Si content is 0.05% or more and 2.0% or less.

Mn: 0.5% or More and 3% or Less

Mn is a chemical element which is effective to improve hardenability of steel by suppressing ferrite transformation. In addition, since Mn lowers the $Ac_3$ transformation point, Mn is a chemical element which is effective in decreasing a heating temperature before hot press-forming. It is necessary that the Mn content be 0.5% or more to realize such effects. On the other hand, when the Mn content is 3% or less, a decrease in the uniformity of properties of a base steel sheet and a hot press-formed part is less likely to occur. Therefore, the Mn content is 0.5% or more and 3% or less.

P: 0.1% or Less

When the P content is 0.1% or less, a decrease in the uniformity of properties of a base steel sheet and a hot press-formed part is less likely to occur, and sufficient toughness is achieved. Therefore, the P content is 0.1% or less.

S: 0.05% or Less

When the S content is 0.05% or less, a hot press-part part has sufficient toughness. Therefore, the S content is 0.05% or less.

Al: 0.10% or Less

When the Al content is 0.10% or less, a base steel sheet has excellent blanking workability and excellent hardenability. Therefore, the Al content is 0.10% or less.

N: 0.010% or Less

When the N content is 0.010% or less, since AN is less likely to be formed at hot rolling or heating before hot press-forming, a base steel sheet has excellent blanking workability and excellent hardenability. Therefore, the N content is 0.010% or less.

The balance of the chemical composition is Fe and inevitable impurities. In addition, as the reason will be described below, it is preferable that the chemical composition further contains at least one selected from Cr: 0.01% or more and 1% or less, Ti: 0.20% or less, and B: 0.0005% or more and 0.08% or less and/or Sb: 0.003% or more and 0.03% or less.

Cr: 0.01% or More and 1% or Less

Cr is a chemical element which is effective in strengthening steel and improving hardenability. It is preferable that the Cr content be 0.01% or more to realize such effects. On the other hand, since there is substantially no disadvantage related to an excessive increase in manufacturing cost when the Cr content is 1% or less, it is preferable that the upper limit of the Cr content be 1%.

Ti: 0.20% or Less

Ti is a chemical element which is effective in strengthening steel and increasing toughness by decreasing a grain size of steel. Also, Ti is a chemical element which is effective in realizing the effect of increasing hardenability through the use of solid solute B, because Ti forms nitrides more readily than B which will be described next. However, when the Ti content is 0.20% or less, rolling load at hot rolling is less likely to increase and the toughness of a hot press-formed part is less likely to decrease. It is preferable that the upper limit of the Ti content be 0.20%.

B: 0.0005% or More and 0.08% or Less

B is a chemical element which is effective in improving hardenability at hot press-forming and improving toughness after hot press-forming. It is preferable that the B content be 0.0005% or more to realize such effects. On the other hand, when the B content is 0.08% or less, rolling load is less likely to increase at hot rolling, and cracks of steel sheet are less likely to occur because a martensite phase or a bainite phase is less likely to be formed after hot rolling. It is preferable that the upper limit of the B content be 0.08%.

Sb: 0.003% or More and 0.03% or Less

Sb is effective in suppressing formation of decarburization layer in the surface portion of steel sheet during hot press-forming process from heating before hot press-forming to cooling after hot press-forming. It is necessary that the Sb content be 0.003% or more to realize such an effect. On the other hand, when the Sb content is 0.03% or less, since rolling load is less likely to increase, productivity is less likely to decrease. Therefore, the Sb content is 0.003% or more and 0.03% or less.

1-4) Method of Manufacturing a Steel Sheet for Hot Press-Forming

First, a zinc coating layer is formed on the base steel sheet described above. There is no particular limitation on what method is used to form a zinc coating layer, and a common method such as a galvanization treatment or an electric zinc coating treatment is available. In addition, there is no particular limitation on what treatment conditions are used, and common conditions may be used.

Even when a coating layer I is formed on the base steel sheet and a coating layer II is further formed on the coating layer I, there is no particular limitation on what coating method and conditions are used.

Subsequently, to form a Si-containing compound layer on the zinc coating layer, it is appropriate that a treatment solution containing a Si-containing compound mainly containing at least one selected from the silicone resins described above is deposited onto the surface of the zinc coating layer and then dried by heating without performing water washing.

Since there is no particular limitation on what method is used to deposit the treatment solution containing a Si-containing compound onto the zinc coating layer, any one of painting method, immersion method, and spraying method may be used, and a roll coater, a squeeze coater, or a die coater may be used. In this case, after a painting treatment, for example, using a squeeze coater, an immersion treatment, or a spraying treatment has been performed, deposition amount control, appearance homogenization, and thickness uniformization may also be performed using an air knife method or a squeeze roll method. In addition, it is preferable that drying by heating be performed so that the maximum steel sheet temperature is 40° C. to 200° C., more preferably 60° C. to 160° C.

1-5) Other Examples

In the steel sheet for press-forming, since it is appropriate that a zinc coating layer and a Si-containing compound layer be formed in this order on a base steel sheet, other layers may be formed between the base steel sheet and the zinc coating layer and between the zinc coating layer and the Si-containing compound layer as long as there is no decrease in the effect.

2) Method of Producing a Hot Press-Formed Part

The steel sheet for hot press-forming described above is heated to a temperature in the range of $Ac_3$ transformation point to 1000° C., and then press-formed into a hot press-formed part.

The steel sheet is heated to the $Ac_3$ transformation point or above before hot press-forming such that hard phases such as a martensite phase are formed by rapid cooling during hot press-forming and thereby the hot press-formed part attains a high strength. The upper limit of the heating temperature is 1000° C. because a large amount of zinc oxides are formed on the surface of the zinc coating layer at a heating temperature higher than 1000° C. and, therefore, excellent perforation corrosion resistance is less likely to be achieved. "Heating temperature" refers to a maximum steel sheet temperature that is reached during heating.

In addition, when an average heating rate during heating before hot press-forming is 100° C./s or more, since the formation of zinc oxides on the surface of the zinc coating layer is suppressed, there is an increase in perforation corrosion resistance. This is because, although the amount of zinc oxides formed on the surface of the zinc coating layer increases with increasing holding time at a high temperature for which a steel sheet is subjected to a high temperature, since the holding time at a high temperature decreases with increasing an average heating rate, formation of zinc oxides on the surface of the zinc coating layer is subsequently suppressed.

There is no particular limitation on the holding time at the maximum steel sheet temperature. The holding time described above is preferably as short as possible to suppress formation of zinc oxides described above, and it is preferable that the holding time be 300 seconds or less, more preferably 60 seconds or less, further more preferably 10 seconds or less.

Examples of the heating method before hot press-forming include heating with, for example, an electric furnace or a gas furnace, flame heating, energization heating, high-frequency heating, and inductive heating. In particular, for example, energization heating, high-frequency heating, or inductive heating is preferable to control an average heating rate to be 100° C./s or more.

By setting the steel sheet for hot press-forming which has been heated as described above onto a mold which is composed of a die and a punch, and press-forming the heated steel sheet, followed by cooling under a desired cooling condition, a hot press-formed part is produced.

3) Hot Press-Formed Part

Since $Zn_2SiO_4$ is formed on the surface of the hot press-formed part which has been produced as described above, the hot press-formed part has excellent perforation corrosion resistance and joint corrosion resistance in a severe environment and excellent paint adhesiveness.

EXAMPLES

A cold-rolled steel sheet having a chemical composition consisting of, by mass %, C: 0.23%, Si: 0.25%, Mn: 1.2%, P: 0.01%, S: 0.01%, Al: 0.03%, N: 0.005%, Cr: 0.20%, Ti: 0.02%, B: 0.0022%, Sb: 0.008%, and the balance being Fe and inevitable impurities, an $Ac_3$ transformation point of 820° C., and a thickness of 1.6 mm was used as a base steel sheet.

Zinc coating layers I having various Ni contents and coating weights were formed on the surface of the cold-rolled steel sheet by performing an electric zinc coating treatment in a coating bath containing 200 g/L of nickel sulfate hexahydrate and 0 to 50 g/L of zinc sulfate heptahydrate and having a pH of 3.0 and a temperature of 50° C. with a current density of 5 to 100 A/dm². Subsequently, zinc coating layers II having various Ni contents, coating weights, and η phase contents were formed on the zinc coating layers I by performing an electric zinc coating treatment in a coating bath containing 200 g/L of nickel sulfate hexahydrate and 10 to 100 g/L of zinc sulfate heptahydrate and having a pH of 1.5 and a temperature of 50° C. with a current density of 5 to 100 A/dm². In the coating layers I and the coating layers II whose Ni contents are not 100 mass %, the balance other than Ni is Zn. The pH of the coating bath was adjusted by controlling the amount of sulfuric acid added.

Subsequently, steel sheets Nos. 1 to 38 were prepared by applying compounds (having a solid content of 15 mass %) containing a Si-containing compound, an inorganic Si-containing compound, a Ti-containing compound, an Al-containing compound, a Zr-containing compound, or Si and Zr-containing compound and the balance being a solvent onto the coating layers II, and drying the applied compounds under the condition of maximum steel sheet temperature of 140° C. to form any compound layers having the various thicknesses given in Tables 1 and 2 which were composed of a Si-containing compound, a Ti-containing compound, an Al-containing compound, a Zr-containing compound, or Si and Zr-containing compound on the coating layers II. In addition, steel No. 39 was prepared by forming a Si-containing compound layer on a galvannealed steel sheet (GA) which had been prepared by performing a galvanization treatment and an alloying treatment on the base steel sheet described above.

The compounds described below were used as a Si-containing compound, an inorganic Si-containing compound, a Ti-containing compound, an Al-containing compound, or a Zr-containing compound.

Silicone resin: KR-242A (having a carbon number of 1) produced by Shin-Etsu Chemical Co., Ltd.

Silicone resin: KR-311 (having a carbon number of 6) produced by Shin-Etsu Chemical Co., Ltd.

Silicone resin: ES-1001N (having a carbon number of 25) produced by Shin-Etsu Chemical Co., Ltd.

Silane coupling agent: KBE-403 (having a carbon number of 6) produced by Shin-Etsu Chemical Co., Ltd.

Silane coupling agent: KBE-585 (having a carbon number of 4) produced by Shin-Etsu Chemical Co., Ltd.

Silane coupling agent: KBE-903 (having a carbon number of 3) produced by Shin-Etsu Chemical Co., Ltd.

Lithium silicate: Lithium Silicate 45 (inorganic Si compound) produced by Nissan Chemical Industries, Ltd.

Colloidal Silica: SNOWTEX (registered trademark) OS (inorganic Si compound) produced by Nissan Chemical Industries, Ltd.

Titanium coupling agent: ORGATIX (registered trademark) TA-22 produced by Matsumoto Fine Chemical Co., Ltd.

Aluminum coupling agent: PLENACT (registered trademark) AL-M produced by Ajinomoto Fine-Techno Co., Inc.

Zirconium coupling agent: ORGATIX (registered trademark) ZA-60 produced by Matsumoto Fine Chemical Co., Ltd.

When a silicone resin was used as a compound, a thinner which was composed of ethylene glycol monobutyl ether and petroleum naphtha at a mass ratio (ethylene glycol monobutyl ether:petroleum naphtha) of 55:45 was used as a solvent. In addition, when compounds other than a silicone resin were used, deionized water was used as a solvent.

Products equivalent to hot press-formed parts were prepared by heating the steel sheets Nos. 1 to 39 having the coating layers I, the coating layers II, and the compound layers or a galvannealed layer and a compound layer using an electric furnace or a direct energization heating method under the heating conditions given in Tables 1 and 2, and cooling the heated steel sheets by inserting the heated the steel sheets into a mold made of Al at the cooling rates given in Tables 1 and 2. Using these products, the peak intensity evaluation of the diffraction peak of $Zn_2SiO_4$ using an X-ray diffraction method, the evaluation of perforation corrosion resistance and joint corrosion resistance, and the evaluation of paint adhesiveness were conducted.

Peak intensity of the diffraction peak of $Zn_2SiO_4$ using an X-ray diffraction method Using the products equivalent to hot press-formed parts described above, diffraction intensity was evaluated using an X-ray diffraction method under the conditions described below.

Measuring apparatus: Rotaflex produced by Riken Corporation

Determining Conditions

X-ray used: Cu—Kα

Removal of Kβ ray: graphite single-crystal monochrometer

Scan speed: 4°/min

Detector: scintillation counter

Diffraction intensity of $Zn_2SiO_4$: the peak intensity of $2\theta=36.1$ degrees (113 plane) was evaluated Perforation corrosion resistance: to evaluate perforation corrosion resistance under the assumption that perforation corrosion tends to occur in a portion in which a sufficient amount of chemical conversion film or electrodeposited coating film is not formed, a sample (70 mm×150 mm) was taken from each of the products equivalent to hot press-formed parts described above, and the surface which was not to be evaluated and the end faces were shielded with tapes. Subsequently, a composite corrosion test consisting of 200 cycles of salt spraying (5 mass % NaCl solution, 35° C., 2 h)→drying (60° C., relative humidity 20% to 30%, 4 h)→wetting (50° C., relative humidity 95%, 2 h) was conducted. By determining the maximum thickness reduction of the sample after the test had been performed, and by conducting evaluation on the basis of the judging criteria described below, a case marked using ⊙, ◯, or Δ was judged to be satisfactory.

⊙: maximum thickness reduction≤0.1 mm

◯: 0.1 mm<maximum thickness reduction≤0.2 mm

Δ: 0.2 mm<maximum thickness reduction≤0.3 mm x: 0.3 mm<maximum thickness reduction Paint adhesiveness: a sample (70 mm×150 mm) was taken from each of the products equivalent to hot press-formed parts described above. Each sample was subjected to a chemical conversion treatment under standard conditions using PB-SX35 produced by Nihon Parkerizing CO., LTD. Subsequently, a painted sample was prepared by electrodepositing a painting film on the sample so that the film thickness was 20 μm using electrodeposition paint GT-10HT produced by Kansai Paint Co., Ltd. and baking the sample at a temperature of 170° C. for a duration of 20 minutes. Then, a lattice pattern (10×10 squares with 1 mm intervals) was formed on the surface which had been subjected to chemical conversion treatment and electrodepositing treatment using a cutter knife so that the depth of the lattice line reached the base steel sheet, and then a tape peeling test was conducted, in which an adhesive tape was stuck to the lattice pattern and then peeled. By conducting evaluation on the basis of the judgment criteria described below, a case marked using ⊙ or ◯ was judged as a case where paint adhesiveness was excellent.

⊙: No squares were peeled off

◯: 1 to 10 squares were peeled off.

Δ: 11 to 30 squares were peeled off.

x: 31 or more squares were peeled off.

Joint corrosion resistance: a large sample (70 mm×150 mm) and a small sample (40 mm×110 mm) were collected from each of the products equivalent to hot press-formed parts described above. Subsequently, the small sample was placed on the center of the large sample (joint), and joined together by welding. A chemical conversion treatment was performed on the joined sample using PB-SX35 manufactured by Nihon Parkerizing CO., LTD. Subsequently, a joint test piece was prepared by electrodepositing electrodeposition paint GT-10HT Gray manufactured by Kansai Paint Co., Ltd on the joined sample and baking the joined sample at a temperature of 170° C. for 20 minutes so that the coating film thickness was 20 μm. Non-evaluated surfaces of the joint test piece were shielded with a tape. The joint test piece was then subjected to a composite corrosion test that included 200 cycles of salt spraying (5 mass % aqueous NaCl solution, 35° C., 2 h)→drying (60° C., relative humidity 20% to 30%, 4 h)→wetting (50° C., relative humidity 95%, 2 h). The welded portion of the joint test piece was drilled and the joint test piece was disassembled. The maximum corrosion depth in the joint was measured evaluated based on the following criteria. Performance was satisfied when the evaluation is ⊚, ○ or Δ.

⊚: maximum corrosion depth≤0.1 mm
○: 0.1 mm<maximum corrosion depth≤0.2 mm
Δ: 0.2 mm<maximum corrosion depth≤0.4 mm
x: 0.4 mm<maximum corrosion depth The results are given in Tables 1 and 2. It is clarified that our examples are all excellent in paint adhesiveness, perforation corrosion resistance, and joint corrosion resistance. In addition, although it is not described in Table 1 or Table 2, the scale was not observed in any of the products equivalent to hot press-formed parts in our examples.

TABLE 1

| | Coating Layer I | | Coating Layer II | | | Si, Ti, Al, or Zr Compound Layer | | | Heating Condition | | | | | | | | |
|---|---|---|---|---|---|---|---|---|---|---|---|---|---|---|---|---|---|
| Steel Sheet No. | Ni Content (mass %) | Coating Weight (g/m²) | Ni Content (mass %) | Coating Weight (g/m²) | η Phase Content (mass %) | Compound | Carbon Number of Organic Functional Group | Thickness (μm) | Average Heating Rate (° C./s) | Heating Temperature (° C.) | Holding Time (s) | Cooling Rate (° C./s) | $Zn_2SiO_4$ Peak Intensity (kcps) | Perforation Corrosion Resistance | Joint Corrosion Resistance | Paint Adhesiveness | Note |
| 1 | 100 | 0.05 | 12 | 45 | 0 | Silicone Resin: KR-242A | 1 | 0.5 | 20 | 900 | 0 | 50 | 0.15 | Δ | X | ⊚ | Comparative Example |
| 2 | 100 | 0.05 | 12 | 45 | 0 | Silicone Resin: KR-311 | 6 | 0.5 | 20 | 900 | 0 | 50 | 0.35 | ○ | ○ | ⊚ | Example |
| 3 | 100 | 0.05 | 12 | 45 | 0 | Silicone Resin: ES-1001N | 25 | 0.5 | 20 | 900 | 0 | 50 | 0.35 | ○ | ○ | ⊚ | Example |
| 4 | 100 | 0.05 | 12 | 45 | 0 | Silane Coupling Agent: KBE-403 | 6 | 0.5 | 20 | 900 | 0 | 50 | 0.19 | Δ | X | ⊚ | Comparative Example |
| 5 | 100 | 0.05 | 12 | 45 | 0 | Silane Coupling Agent: KBE-585 | 4 | 0.5 | 20 | 900 | 0 | 50 | 0.15 | Δ | X | ⊚ | Comparative Example |
| 6 | 100 | 0.05 | 12 | 45 | 0 | Silane Coupling Agent: KBE-903 | 3 | 0.5 | 20 | 900 | 0 | 50 | 0.13 | Δ | X | ⊚ | Comparative Example |
| 7 | 100 | 0.05 | 12 | 45 | 0 | Lithium Silicate | 0 | 0.5 | 20 | 900 | 0 | 50 | 0.11 | X | X | ⊚ | Comparative Example |
| 8 | 100 | 0.05 | 12 | 45 | 0 | Colloidal Silica | 0 | 0.5 | 20 | 900 | 0 | 50 | 0.08 | X | X | ⊚ | Comparative Example |
| 9 | 100 | 0.05 | 12 | 45 | 0 | Titanium Coupling Agent | 4 | 0.5 | 20 | 900 | 0 | 50 | 0 | X | X | ⊚ | Comparative Example |
| 10 | 100 | 0.05 | 12 | 45 | 0 | Aluminum Coupling Agent | 18 | 0.5 | 20 | 900 | 0 | 50 | 0 | X | X | ⊚ | Comparative Example |
| 11 | 100 | 0.05 | 12 | 45 | 0 | Zirconium Coupling Agent | 4 | 0.5 | 20 | 900 | 0 | 50 | 0 | X | X | ⊚ | Comparative Example |
| 12 | 100 | 0.05 | 12 | 45 | 0 | Silicone Resin: KR-311/ Silane Coupling Agent: KBE-403 = 5/5 | 6/6 | 0.5 | 20 | 900 | 0 | 50 | 0.30 | ○ | ○ | ⊚ | Example |
| 13 | 100 | 0.05 | 12 | 45 | 0 | Silicone Resin: KR-311/ Silane Coupling | 6/6 | 0.5 | 20 | 900 | 0 | 50 | 0.25 | ○ | Δ | ⊚ | Example |

TABLE 1-continued

| | Coating Layer I | | Coating Layer II | | | Si, Ti, Al, or Zr Compound Layer | | | Heating Condition | | | | | | | |
|---|---|---|---|---|---|---|---|---|---|---|---|---|---|---|---|---|
| Steel Sheet No. | Ni Content (mass %) | Coating Weight (g/m²) | Ni Content (mass %) | Coating Weight (g/m²) | η Phase Content (mass %) | Compound | Carbon Number of Organic Functional Group | Thickness (μm) | Average Heating Rate (° C./s) | Heating Temperature (° C.) | Holding Time (s) | Cooling Rate (° C./s) | Zn₂SiO₄ Peak Intensity (kcps) | Perforation Corrosion Resistance | Joint Corrosion Resistance | Paint Adhesiveness | Note |
| 14 | 100 | 0.05 | 12 | 45 | 0 | Silicone Resin: KR-311/ Silane Coupling Agent: KBE-403 = 4/6 | 6/3 | 0.5 | 20 | 900 | 0 | 50 | 0.33 | ○ | Δ | ◎ | Example |
| 15 | 100 | 0.05 | 12 | 45 | 0 | Silicone Resin: KR-311/ Silane Coupling Agent: KBE-903 = 5/5 | 6/4 | 0.5 | 20 | 900 | 0 | 50 | 0.20 | Δ | Δ | ◎ | Example |
|  |  |  |  |  |  | Silicone Resin: KR-311/ Titanium Coupling Agent = 5/5 |  |  |  |  |  |  |  |  |  |  |  |
| 16 | 100 | 0.05 | 12 | 45 | 0 | — | — | — | 20 | 900 | 0 | 50 | 0 | X | X | Δ | Comparative Example |
| 17 | 100 | 0.05 | 12 | 45 | 0 | Silicone Resin: KR-311 | 6 | 0.1 | 20 | 900 | 0 | 50 | 0.21 | Δ | Δ | ○ | Example |
| 18 | 100 | 0.05 | 12 | 45 | 0 | Silicone Resin: KR-311 | 6 | 0.4 | 20 | 900 | 0 | 50 | 0.31 | ○ | ○ | ◎ | Example |
| 19 | 100 | 0.05 | 12 | 45 | 0 | Silicone Resin: KR-311 | 6 | 2.0 | 20 | 900 | 0 | 50 | 0.94 | ○ | ◎ | ◎ | Example |
| 20 | 100 | 0.05 | 12 | 45 | 0 | Silicone Resin: KR-311 | 6 | 3.0 | 20 | 900 | 0 | 50 | 1.14 | ○ | ◎ | ○ | Example |
| 21 | 100 | 0.05 | 12 | 45 | 0 | Silicone Resin: KR-311 | 6 | 4.0 | 20 | 900 | 0 | 50 | 1.76 | ◎ | ◎ | ○ | Example |
| 22 | 60 | 0.05 | 12 | 45 | 0 | Silicone Resin: KR-311 | 6 | 0.5 | 20 | 900 | 0 | 50 | 0.34 | Δ | ○ | ◎ | Example |
| 23 | 100 | 0.01 | 12 | 45 | 0 | Silicone Resin: KR-311 | 6 | 0.5 | 20 | 900 | 0 | 50 | 0.32 | Δ | ○ | ◎ | Example |

TABLE 2

| | Coating Layer I | | Coating Layer II | | | Si, Ti, Al, or Zr Compound Layer | | | Heating Condition | | | | | | | |
|---|---|---|---|---|---|---|---|---|---|---|---|---|---|---|---|---|
| Steel Sheet No. | Ni Content (mass %) | Coating Weight (g/m²) | Ni Content (mass %) | Coating Weight (g/m²) | η Phase Content (mass %) | Compound | Carbon Number of Organic Functional Group | Thickness (μm) | Average Heating Rate (° C./s) | Heating Temperature (° C.) | Holding Time (s) | Cooling Rate (° C./s) | Zn₂SiO₄ Peak Intensity (kcps) | Perforation Corrosion Resistance | Joint Corrosion Resistance | Paint Adhesiveness | Note |
| 24 | 100 | 0.5 | 12 | 45 | 0 | Silicone Resin: KR-311 | 6 | 0.5 | 20 | 900 | 0 | 50 | 0.33 | ○ | ○ | ◎ | Example |

TABLE 2-continued

| | Coating Layer I | | Coating Layer II | | | Si, Ti, Al, or Zr Compound Layer | | | Heating Condition | | | | | Performance | | | |
|---|---|---|---|---|---|---|---|---|---|---|---|---|---|---|---|---|---|
| Steel Sheet No. | Ni Content (mass %) | Coating Weight (g/m²) | Ni Content (mass %) | Coating Weight (g/m²) | η Phase Content (mass %) | Compound | Carbon Number of Organic Functional Group | Thickness (μm) | Average Heating Rate (° C./s) | Heating Temperature (° C.) | Holding Time (s) | Cooling Rate (° C./s) | Zn₂SiO₄ Peak Intensity (kcps) | Perforation Corrosion Resistance | Joint Corrosion Resistance | Paint Adhesiveness | Note |
| 25 | 100 | 5 | 12 | 45 | 0 | Silicone Resin: KR-311 | 6 | 0.5 | 20 | 900 | 0 | 50 | 0.33 | ○ | ○ | ◎ | Example |
| 26 | 100 | 0.05 | 10 | 45 | 1 | Silicone Resin: KR-311 | 6 | 0.5 | 20 | 900 | 0 | 50 | 0.36 | ○ | ○ | ◎ | Example |
| 27 | 100 | 0.05 | 18 | 45 | 0 | Silicone Resin: KR-311 | 6 | 0.5 | 20 | 900 | 0 | 50 | 0.31 | ○ | ○ | ◎ | Example |
| 28 | 100 | 0.05 | 25 | 45 | 0 | Silicone Resin: KR-311 | 6 | 0.5 | 20 | 900 | 0 | 50 | 0.30 | ○ | ○ | ◎ | Example |
| 29 | 100 | 0.05 | 12 | 10 | 0 | Silicone Resin: KR-311 | 6 | 0.5 | 20 | 900 | 0 | 50 | 0.21 | Δ | Δ | ◎ | Example |
| 30 | 100 | 0.05 | 12 | 60 | 0 | Silicone Resin: KR-311 | 6 | 0.5 | 20 | 900 | 0 | 50 | 0.40 | ○ | ◎ | ◎ | Example |
| 31 | 100 | 0.05 | 12 | 90 | 0 | Silicone Resin: KR-311 | 6 | 0.5 | 20 | 900 | 0 | 50 | 0.52 | ◎ | ◎ | ◎ | Example |
| 32 | 100 | 0.05 | 12 | 45 | 0 | Silicone Resin: KR-311 | 6 | 0.5 | 50 | 900 | 0 | 50 | 0.35 | ○ | ○ | ◎ | Example |
| 33 | 100 | 0.05 | 12 | 45 | 0 | Silicone Resin: KR-311 | 6 | 0.5 | 100 | 900 | 0 | 50 | 0.39 | ◎ | ○ | ◎ | Example |
| 34 | 100 | 0.05 | 12 | 45 | 0 | Silicone Resin: KR-311 | 6 | 0.5 | 120 | 900 | 0 | 50 | 0.41 | ◎ | ○ | ◎ | Example |
| 35 | 100 | 0.05 | 12 | 45 | 0 | Silicone Resin: KR-311 | 6 | 0.5 | 20 | 850 | 0 | 50 | 0.32 | ○ | ○ | ◎ | Example |
| 36 | 100 | 0.05 | 12 | 45 | 0 | Silicone Resin: KR-311 | 6 | 0.5 | 20 | 950 | 0 | 50 | 0.34 | ○ | ○ | ◎ | Example |
| 37 | 100 | 0.05 | 12 | 45 | 0 | Silicone Resin: KR-311 | 6 | 0.5 | 20 | 900 | 300 | 50 | 0.38 | ○ | ○ | ◎ | Example |
| 38 | 100 | 0.05 | 12 | 45 | 0 | Silicone Resin: KR-311 | 6 | 0.5 | 20 | 900 | 0 | 20 | 0.34 | ○ | ○ | ◎ | Example |
| 39 | GA, Coating Weight 45 g/m² | | | | | Silicone Resin: KR-311 | 6 | 0.5 | 20 | 900 | 0 | 50 | 0.21 | Δ | Δ | ○ | Example |

In the examples, hot press-forming was not actually performed. However, paint adhesiveness, perforation corrosion resistance, and joint corrosion resistance of hot press-formed part depend on changes in the coating layer which occurs at heating before hot press-forming. Therefore, the paint adhesiveness, perforation corrosion resistance, and joint corrosion resistance of hot press-formed part can be evaluated on the basis of the results of the examples.

The invention claimed is:

1. A steel sheet for hot press-forming comprising a zinc coating layer on a surface of a base steel sheet and a Si-containing compound layer on a surface of the zinc coating layer, wherein the Si-containing compound layer contains a silicone resin having an organic functional group of a carbon number of 4 or more and a silane coupling agent having an organic functional group of a carbon number of 4 or more, and a compounding ratio of the silicone resin and the silane coupling agent is 5/5 or more in terms of mass ratio (silicone resin/silane coupling agent), and $Zn_2SiO_4$ is formed in the Si-containing compound layer by a reaction between the silicone resin and zinc coating layer during hot press at a steel sheet temperature range of $Ac_3$ transformation point to 1000° C.

2. The steel sheet according to claim 1, wherein the zinc coating layer consists of a coating layer I and a coating layer II in this order on a base steel sheet, and the coating layer I contains 60 mass % or more of Ni and the balance being Zn and inevitable impurities and has a coating weight of 0.01 g/m² or more and 5 g/m² or less, and the coating layer II contains 10 mass % or more and 25 mass % or less of Ni and the balance being Zn and inevitable impurities and has a coating weight of 10 g/m² or more and 90 g/m² or less.

3. The steel sheet according to claim 2, wherein the base steel sheet has a chemical composition consisting of, by mass %, C: 0.15% or more and 0.5% or less, Si: 0.05% or more and 2.0% or less, Mn: 0.5% or more and 3% or less, P: 0.1% or less, S: 0.05% or less, Al: 0.10% or less, N: 0.010% or less, and the balance being Fe and inevitable impurities.

4. The steel sheet according to claim 1, wherein the base steel sheet has a chemical composition consisting of, by mass %, C: 0.15% or more and 0.5% or less, Si: 0.05% or more and 2.0% or less, Mn: 0.5% or more and 3% or less, P: 0.1% or less, S: 0.05% or less, Al: 0.10% or less, N: 0.010% or less, and the balance being Fe and inevitable impurities.

5. The steel sheet according to claim 4, wherein the chemical composition further contains, by mass %, at least one selected from Cr: 0.01% or more and 1% or less, Ti: 0.20% or less, and B: 0.0005% or more and 0.08% or less.

6. The steel sheet according to claim 5, wherein the chemical composition further contains, by mass %, Sb: 0.003% or more and 0.03% or less.

7. The steel sheet according to claim 4, wherein the chemical composition further contains, by mass %, Sb: 0.003% or more and 0.03% or less.

8. A hot press-formed part produced by heating the steel sheet according to claim 1, and hot press-forming the heated steel sheet, wherein a diffraction peak of $Zn_2SiO_4$ in a vicinity of $2\theta=36.1$ degrees having a peak intensity of 0.20 kcps or more is observed when an X-ray diffraction intensity measurement is performed on the surface of the hot press-formed part.

9. A method of producing a hot press-formed part comprising: heating the steel sheet according to claim 1 to a temperature in a range of $Ac_3$ transformation point to 1000° C., and hot press-forming the heated steel sheet.

10. The method according to claim 9, wherein the steel sheet is heated at an average heating rate of 100° C./s or more to a temperature in the range of $Ac_3$ transformation point to 1000° C.

11. A hot press-formed part produced by heating the steel sheet according to claim 2, and hot press-forming the heated steel sheet, wherein a diffraction peak of $Zn_2SiO_4$ in a vicinity of $2\theta=36.1$ degrees having a peak intensity of 0.20 kcps or more is observed when an X-ray diffraction intensity measurement is performed on the surface of the hot press-formed part.

12. A hot press-formed part produced by heating the steel sheet according to claim 4, and hot press-forming the heated steel sheet, wherein a diffraction peak of $Zn_2SiO_4$ in a vicinity of $2\theta=36.1$ degrees having a peak intensity of 0.20 kcps or more is observed when an X-ray diffraction intensity measurement is performed on the surface of the hot press-formed part.

13. A hot press-formed part produced by heating the steel sheet according to claim 5, and hot press-forming the heated steel sheet, wherein a diffraction peak of $Zn_2SiO_4$ in a vicinity of $2\theta=36.1$ degrees having a peak intensity of 0.20 kcps or more is observed when an X-ray diffraction intensity measurement is performed on the surface of the hot press-formed part.

14. A hot press-formed part produced by heating the steel sheet according to claim 7, and hot press-forming the heated steel sheet, wherein a diffraction peak of $Zn_2SiO_4$ in a vicinity of $2\theta=36.1$ degrees having a peak intensity of 0.20 kcps or more is observed when an X-ray diffraction intensity measurement is performed on the surface of the hot press-formed part.

15. A hot press-formed part produced by heating the steel sheet according to claim 6, and hot press-forming the heated steel sheet, wherein a diffraction peak of $Zn_2SiO_4$ in a vicinity of $2\theta=36.1$ degrees having a peak intensity of 0.20 kcps or more is observed when an X-ray diffraction intensity measurement is performed on the surface of the hot press-formed part.

* * * * *